(12) United States Patent
Kaczman et al.

(10) Patent No.: US 8,073,078 B2
(45) Date of Patent: Dec. 6, 2011

(54) SPLIT CHANNEL RECEIVER WITH VERY LOW SECOND ORDER INTERMODULATION

(75) Inventors: Daniel L. Kaczman, Gurnee, IL (US); Manish N. Shah, Vernon Hills, IL (US)

(73) Assignee: Freescale Semiconductor, Inc., Austin, TX (US)

( * ) Notice: Subject to any disclaimer, the term of this patent is extended or adjusted under 35 U.S.C. 154(b) by 684 days.

(21) Appl. No.: 12/028,623

(22) Filed: Feb. 8, 2008

(65) Prior Publication Data

US 2009/0202022 A1 Aug. 13, 2009

(51) Int. Cl.
*H03K 9/00* (2006.01)
(52) U.S. Cl. ......... 375/316; 330/250; 330/288; 331/132
(58) Field of Classification Search ................. None
See application file for complete search history.

(56) References Cited

U.S. PATENT DOCUMENTS

| | | | | |
|---|---|---|---|---|
| 6,150,885 | A * | 11/2000 | Ashby et al. .................. | 330/257 |
| 7,177,616 | B2 | 2/2007 | Connell et al. | |
| 2004/0203479 | A1* | 10/2004 | Lin ................................ | 455/73 |
| 2005/0118975 | A1* | 6/2005 | Ismail .......................... | 455/283 |
| 2005/0174167 | A1* | 8/2005 | Vilander et al. ............. | 327/560 |
| 2007/0132500 | A1 | 6/2007 | Embabi et al. | |
| 2008/0175307 | A1* | 7/2008 | Brunn et al. .................. | 375/148 |

OTHER PUBLICATIONS

U.S. Appl. No. 12/021,534, filed Jan. 29, 2008, Kaczman et al.
Sacchi et al., "A 15 mW, 70 kHz 1 / f Corner Direct Conversation CMOS Receiver", IEEE 2003 Custom Integrated Circuits Conference, 2003, pp. 459-462.

* cited by examiner

*Primary Examiner* — David C. Payne
*Assistant Examiner* — Adolf Dsouza
(74) *Attorney, Agent, or Firm* — Lempia Summerfield Katz LLC

(57) ABSTRACT

A high performance radio frequency receiver includes an isolated transconductance amplifier with large binary and stepped gain control range, controlled impedance, and enhanced blocker immunity, for amplifying and converting a radio frequency signal to multiple electrically isolated currents; a pulse generator for generating in-phase and quadrature pulses; a crossover correction circuit and pulse shaper for controlling a crossover threshold of the pulses and interaction between in-phase and quadrature mixers; and a double balanced mixer for combining the RF signal with the pulses to generate an intermediate frequency or baseband zero intermediate frequency current-mode signal. The intermediate frequency signal and second order harmonics may be filtered with a high frequency low pass filter and a current injected complex direct-coupled filter. IIP2 calibration of the in-phase and quadrature channels may be optimized using the isolated transconductance amplifier.

24 Claims, 7 Drawing Sheets

SPLIT CHANNEL RECEIVER WITH VERY LOW SECOND ORDER INTERMODULATION

BACKGROUND

1. Field

The present embodiments relate generally to communications, and more specifically, to radio frequency receivers in communications.

2. Related Art

Radio frequency (RF) receivers used in modern communication systems may support multiple modes and networks, such as 3G wideband code division multiple access (WCDMA) and 2G Global System for Mobile communications (GSM), using time division multiple access (TDMA). A received RF signal in a certain mode may be translated into a specified frequency band and processed to retrieve the information contained in the RF signal. For example, an RF receiver may amplify, filter, and mix an analog received RF signal into in-phase (I) and quadrature (Q) signals that may be converted into digital signals for further processing.

The multiple modes may utilize the same RF receiver architecture but have different frequency ranges and linearity, noise figure, and sensitivity requirements. Noise figure is a measure of degradation of a signal-to-noise ratio caused by components in the RF receiver. A WCDMA system has full duplex functionality where separate receive and transmit signals may be active simultaneously. A higher power transmitted signal may leak into the receive signal in such a system. To relax linearity and noise requirements due to the transmit signal leakage, a conventional WCDMA system may include a surface acoustic wave (SAW) filter prior to a mixer and downstream processing stages. In addition, a conventional WCMDA system may include a low noise amplifier (LNA) to meet sensitivity, noise figure, and gain control requirements. Using a SAW filter, LNA, amplifiers, and other components may result in increased die size, current drain, cost, and complexity, and reduced performance of an RF receiver.

When a RF receiver receives a two-tone continuous wave or amplitude modulation modulated signal, second order intermodulation distortion (IMD2) may be generated. As IMD2 increases, the signal-to-noise ratio (SNR) and second order input intercept point (IIP2) may decrease, resulting in degraded performance of the RF receiver. In a conventional RF receiver, separate I and Q mixers may combine a received RF signal with I and Q pulses generated from a local oscillator. The received RF signal may be connected to the I and Q mixers from a common node, where the I and Q channels may interact because the I and Q mixers are not electrically isolated. This interaction may allow a DC offset and imbalance on one channel to amplify the DC offset and imbalance on the other channel, resulting in an increased overall DC offset and imbalance and degraded IIP2.

When the received RF signal is connected to the I and Q mixers from a common node, calibration of the IIP2 levels of the I and Q channels to optimal levels may be difficult. Because the mismatch and imbalance in each channel may be different, optimizing one channel for optimal IIP2 level may adversely affect the IIP2 level of the other channel, and vice versa, resulting in overall sub-optimal performance. The combined mismatches and imbalances of the channels may also fall outside of the range of calibration. IIP2 calibration may therefore be limited when attempting to optimize both I and Q channels in a conventional RF receiver topology. In addition, adding additional stages to achieve better isolation can increase die area and current, and create additional gain in front of the mixer, which can degrade the input referred IIP2. An additional stage can also create a voltage mode combining point, create additional local oscillator feed thorough paths, and add another block for potential mismatch.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

By way of introduction, the embodiments described below include a radio frequency (RF) receiver including a transconductance amplifier, a pulse generator, a passive double balanced mixer, and a direct coupled complex filter. The transconductance amplifier may amplify and convert a received voltage of an RF signal to electrically isolated in-phase (I) and quadrature (Q) currents. The currents may be injected into the passive double balanced mixer to combine the currents with I and Q pulses to generate I and Q signals. Digital-to-analog converters may generate second order intercept point (IIP2) calibration signals for the I and Q channels. The IIP2 calibration signals may be combined in the mixer with the I and Q pulses when generating the I and Q signals. Adjusting the IIP2 level of the I channel does not affect the IIP2 level of the Q channel, and vice versa. A crossover correction circuit may control an amplitude crossover threshold of the I and Q pulses to reduce the amount of time switches in the mixer are simultaneously active when the I and Q pulses are rising and falling. The I and Q pulses may have duty cycles of less than 35% and be generated by the pulse generator. The I and Q signals may be current injected into the direct coupled complex filter to generate filtered voltage signals for further processing. These embodiments of an RF receiver may result in improved IIP2 and very low second order intermodulation distortion (IMD2).

Figure 1:
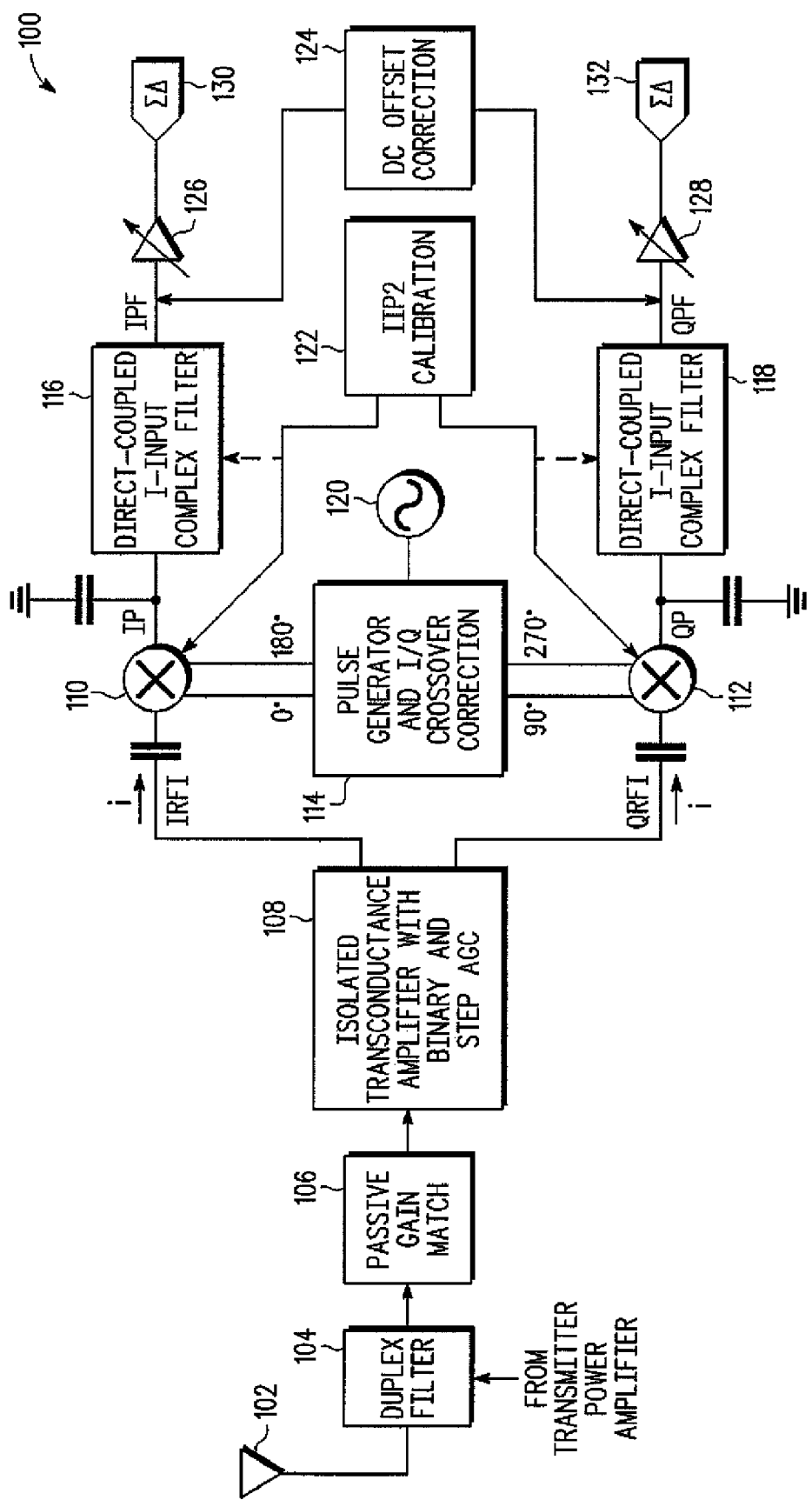
FIG. 1 is a diagram of an embodiment of a radio frequency receiver.

FIG. 1 shows an embodiment of a radio frequency receiver 100. All or a portion of the RF receiver 100 may be fabricated as an integrated circuit. The RF receiver 100 may also include discrete components. The RF receiver 100 receives an RF signal on an antenna 102 for processing to filtered voltage signals IPF and QPF in a certain frequency band. The filtered voltage signals IPF and QPF may be provided to optional baseband gain amplifiers 126 and 128 to provide additional gain, filtering, and automatic gain control (AGC) range. In addition the receiver 100 may include an IIP2 calibration circuit 122 and/or a DC offset correction circuit 124. The DC offset correction circuit 124 may be included after direct coupled filters 116 and 118 and prior to the baseband gain amplifiers 126 and 128. Analog-to-digital converters 130 and 132 may then recover the information contained in the received RF signal.

The received RF signal may be filtered by a duplex filter 104. The duplex filter 104 may include a receive filter for filtering received RF signals and a transmit filter for filtering transmit RF signals from a power amplifier in a transmitter. Noise and interference in the RF signals may be attenuated by the duplex filter 104. For example, for 3GPP Band I, the duplex filter 104 allows signals from approximately 2110 MHz to 2170 MHz to pass from the antenna 102 to the receiver, and allows signals from approximately 1920 MHz to 1980 MHz to pass from the transmitter to the antenna 102. The receive filter may be substantially isolated from the transmit filter in the duplex filter 104. However, in a full duplex WCDMA system, for example, both the received and transmitted signals may be active simultaneously. A higher power transmitted signal may leak into the received signal in the duplex filter 104, leading to a degradation of the noise figure, gain, and performance of the RF receiver 100.

The filtered RF signal from the duplex filter 104 may be input to a passive gain matching circuit 106. The passive gain matching circuit 106 steps up the impedance of the filtered RF signal such that the voltage of the filtered RF signal is multiplied by a gain while adding minimal noise. The matching circuit 106 may also include a high-pass filter to provide extra rejection and attenuation of leaked transmit RF signals that are at a lower frequency than received RF signals.

The filtered and matched RF signal may be input into an isolated transconductance amplifier 108 that amplifies and converts the RF signal from a voltage to currents. The amplifier 108 may generate multiple currents that are electrically isolated from one another. In particular, a current IRFI may drive an in-phase mixer 110 and a current QRFI may drive a quadrature mixer 112. Splitting the current before the cascode stage in the amplifier 108 provides isolation between the I channel and Q channel. The isolation between the I and Q channels allows the IIP2 calibration circuit 122 to independently calibrate the IIP2 level of the I channel and the IIP2 level of the Q channel without affecting the other to achieve a maximum possible overall IIP2. Independent optimization of the IIP2 levels of the I and Q channels allow the IIP2 calibration circuit 122 to use a faster calibration algorithm, which can reduce the calibration time. The isolation also results in reduced absolute DC offsets and imbalances. Using an isolated transconductance amplifier to isolate the mixer channels results in a current mode connection from the match to the filter input, offering optimal linearity. The sensitive junction node between mixers is also eliminated, and the parasitic capacitance at the mixer inputs is reduced, which can degrade IIP2. No additional stages are needed for isolation in the amplifier 108, which avoids additional local oscillator feed through combining points at a voltage mode connection. This may allow calibration of the overall IIP2 level of the receiver 100 to be optimized.

The gain of the amplifier 108 may be determined by the transconductance of the amplifier 108 and the feedback resistance of the direct coupled filters 116 and 118. For example, for WCDMA SAW-less operation, the gain of the amplifier 108, passive mixers 110 and 112, and direct coupled filters 116 and 118 may be set to approximately 45 dB±2 dB. In this case, a gain control range of approximately 40 dB±1 dB with controlled input impedance may be provided in the amplifier 108. The RF signal may be input to the amplifier 108 as differential signals to reduce the effects of interference and noise.

The amplifier 108 may include step and binary weighted gain control to increase the dynamic range of the receiver, and to provide larger gain to weaker signals and smaller gain to stronger signals. The step gain control in the amplifier 108 may adjust the gain in discrete intervals. The binary weighted gain control may further adjust the gain in binary intervals with digital control bits provided by a controller. Binary weighted gain control may be achieved by switching current away from the load. The digital control bits may be any desired bit width to adjust the gain in binary intervals. Binary weighted gain control may be implemented with any number of control bits where attenuation for each step is determined by the equation $20*\log(1-2^{\wedge}(n-2)/(2^{\wedge}n-1))$, where n is the number of control bits. However, as the number of control bits exceeds approximately five bits, the circuit complexity and die area may increase, and gain control range may diminish due to layout and device parasitics. For example, a five bit binary weighted gain control without a coarse step can achieve thirty steps for a total gain control range of approximately 29.8 dB versus a desired range. A 10.7 dB coarse step may be added to achieve a 40.3 dB total RF automatic gain control (AGC) range required for WCDMA SAW-less operation within a single stage. The coarse step gain control may add additional gain control range by reducing load resistance through adding a smaller shunt load.

The amplifier 108 may also minimize desensitization of the receiver 100 due to large blocking signals. A large continuous wave or modulated blocking signal at the input of the receiver 100 may cause nonlinear effects and receiver desensitization due to a rise in the noise figure. Non-linear mixing of bias circuit noise with a large blocking signal, for example, may contribute to a rise in the noise figure. For example, an active bias generator 302 (shown in FIG. 3) may bias the amplifier 108 to prevent bias noise from mixing into the receiver 100. The drain and gate of an NMOS current mirror 304 in the active bias generator 302 is connected to the gate and source of an NMOS transistor 306, respectively, which operates in the deep triode region. The drain of the NMOS transistor 306 is connected to the supply voltage Vcc. With this bias from the active bias generator 302, noise figure desensitization may be improved at all blocker offsets. A small trickle bias current source may also be connected from the gate of the NMOS current mirror 304 and the source of the NMOS transistor 306 to ground to aid start up.

Referring again to FIG. 1, the I and Q passive double balanced mixers 110 and 112 may be driven by the electrically isolated currents IRFI and QRFI generated by the amplifier 108. The currents IRFI and QRFI may be input to the mixers 110 and 112 as differential signals. The mixers 110 and 112 may combine the currents IRFI and QRFI with I and Q pulses and with I and Q IIP2 calibration signals, respectively, to produce a set of currents IP and QP as intermediate frequency signals. The intermediate frequency signals may be zero intermediate frequency baseband signals that are produced when the receiver 100 is in a direct conversion mode, e.g., when the frequency of the received RF signal and the frequency of a periodic signal from a local oscillator 120 are approximately equal. The currents IP and QP may be generated as differential signals to reduce the effects of interference and noise.

An IIP2 calibration circuit 122 may adjust the IIP2 levels of the I and Q channels at the I mixer 110 and the Q mixer 112, respectively. During the warm-up process of the receiver 100, calibration signals may be injected into the receiver 100 which generate second order intermodulation distortion (IMD2). The IMD2 level is measured by a digital signal processor for each of the I and Q channels. The IMD2 level may be minimized by varying the digital code applied to digital-to-analog converters (DAC) in the IIP2 calibration circuit 122. The DACs convert a digital code into an analog DC voltage to adjust the DC bias for the I mixer and Q mixer to optimize the IIP2 of the mixers. Because the currents IRFI and QRFI are electrically isolated from one another, IIP2 calibration at the I mixer does not substantially affect the existing IIP2 level at the Q mixer, and vice versa. In this way, the overall IIP2 of the receiver 100 can be optimized.

A pulse generator 114 may generate the I and Q pulses based on a periodic signal from the local oscillator 120. The periodic signal may be a frequency multiple of the received RF signal or may be another frequency. The I and Q pulses may have a duty cycle of less than 35%. Other duty cycles above 35% are possible, but the performance of the amplifier 108 and direct coupled filters 116 and 118 may be degraded when the duty cycle is more than 35%. The duty cycle of the I and Q pulses may range from 20-35%. The I pulses may include a first pulse zero degrees out of phase from the periodic signal, and a second pulse 180 degrees out of phase from the periodic signal. The Q pulses may include a third pulse 90 degrees out of phase from the periodic signal, and a fourth pulse 270 degrees out of phase from the periodic signal. The pulse generator 114 may generate the I and Q pulses using latches, combinatorial logic, sequential logic, or other logic.

The pulse generator 114 may also include an optional crossover correction circuit to control an amplitude crossover threshold of the I and Q pulses. The crossover correction circuit may adjust the amplitude crossover threshold to reduce the amount of time the I and Q pulses are simultaneously active. The amplitude crossover threshold may include a crossing point of the I and Q pulses when one pulse is rising and the other is falling, for example. In other words, because the I and Q pulses may control switches in the mixers 110 and 112, it is desirable to adjust the amplitude crossover threshold of the I and Q pulses so that the switches are not turned on at the same time. Performance of the RF receiver 100 may be improved and current drain may be reduced when the amplitude crossover threshold is adjusted in this fashion. The crossover correction circuit may operate in parallel with the pulse generator 114, and adjust the I and Q pulses provided to the mixers 110 and 112. Using the mixers 110 and 112 to combine I and Q currents with less than 35% duty cycle crossover corrected I and Q pulses may result in an improvement in gain, noise figure, linearity, and IIP2, as well as a reduction in 1/f noise and noise figure degradation when a large blocker signal is present.

Crossover correction in the pulse generator 114 may be beneficial in a WCDMA full duplex SAW-less receiver where the noise figure of the receiver 100 should be very low in the presence of a large transmitter signal. For example, gain, noise figure, IIP3, IIP2 and 1/f noise may be improved by approximately 3 dB, 2.5 dB, 3 dB, 15 dB and 15 dB, respectively. Adjusting the gate threshold and sharpening the fall time of the pulse may result in additional pulse shaping. The crossover between the I and Q pulses can be further reduced by decreasing the channel width-to-length (W/L) ratio of the PMOS device relative to the NMOS inverter device of a complementary inverter. For example, a complementary rail-to-rail inverter may be optimized with a PMOS device W/L ratio of 2.5 and an NMOS device W/L ratio of 1. Alternatively, by making the W/L ratio of the PMOS device equal to 1 and the W/L ratio of the NMOS device equal to 1, the falling edge may be made sharper than the rising edge, and the crossover is reduced. If a rail-to-rail output AND or NOR gate is used instead of an inverter, the complementary output devices can be sized to have similar effect.

The direct coupled complex filters 116 and 118 may receive and filter the current-injected intermediate frequency signals. The filters 116 and 118 are transimpedance filters where the inputs are currents that are filtered and transferred into voltages at the output. The filters 116 and 118 may perform second ordering filtering of the intermediate frequency signal. The filters 116 and 118 may include voltage mode operational amplifiers with current inputs. Current mode amplifiers, including current conveyors and other types of operational amplifiers, may also be used in the filters 116 and 118. The order of the filter and structure of the filter is not limited to second order and may be tailored to a particular application. The filtered signal generated by the filters 116 and 118 may be amplified by low noise amplifiers 126 and 128 prior to conversion to a digital signal in the analog-to-digital converters 130 and 132. Alternately, the filtered signal may be provided to the analog-to-digital converters 130 and 132 without amplification. The resulting digital signal may be processed downstream using digital signal processing to retrieve the information contained within the received RF signal.

The filters 116 and 118 include no resistors at the input that add noise and significantly degrade linearity (e.g., voltage mode operation). Since the filters 116 and 118 do not have a resistor at the input and instead operate in current mode, the gain is determined by the transconductance of the circuit prior to the filters 116 and 118 in the receiver 100 and by feedback resistors that may be present in the filters 116 and 118. Other combinations of passive and/or active elements may be included in the filters 116 and 118. The direct coupled filters 116 and 118 may be realized with a multitude of filter and operational amplifier topologies, and combinations thereof, for example Av, Ai, or current conveyor, and can be expanded to include any order of filter.

Configuring the filters 116 and 118 in this fashion may allow elimination of the pole within the modulation bandwidth used in conventional RF receivers. Using direct coupled complex filters 116 and 118 may result in a relaxed linearity requirement in downstream processing stages, and reduction in noise, die size, and current drain. For example, for 3GPP Bands II, III, and V, where a 3G system co-exists with a 2G GSM system, a 3G receiver is required to meet narrow band blocker at 2.7 MHz and 3.5 MHz. A conventional receiver may achieve this requirement by putting a pole in a modulation bandwidth. This is not desirable for a SAW-less receiver as it may significantly degrade the noise figure of the receiver. Also, in a conventional receiver, the pole in the modulation bandwidth is typically realized as RC feedback in a transimpedance amplifier. This transimpedance stage, with a non-complex pole, adds current drain and die area. The lower frequency of the mixer pole also contributes to additional die area. The transfer function of the complex filter following this transimpedance stage in a conventional receiver typically has to correct for the in-band pole, resulting in higher in-band ripple and higher group delay ripple. In-band pole and noise figure degradation may be eliminated by using the direct coupled filters 116 and 118 with second order complex filtering. For example, the noise figure of a WCDMA receiver may be improved by approximately 0.3 dB by using the direct coupled filters 116 and 118 and eliminating the in-band pole and biquad noise peaking. Group delay in-band ripple for a WCDMA/GSM compressed-mode receiver may be reduced from approximately 139 ns to 65 ns.

Figure 2:
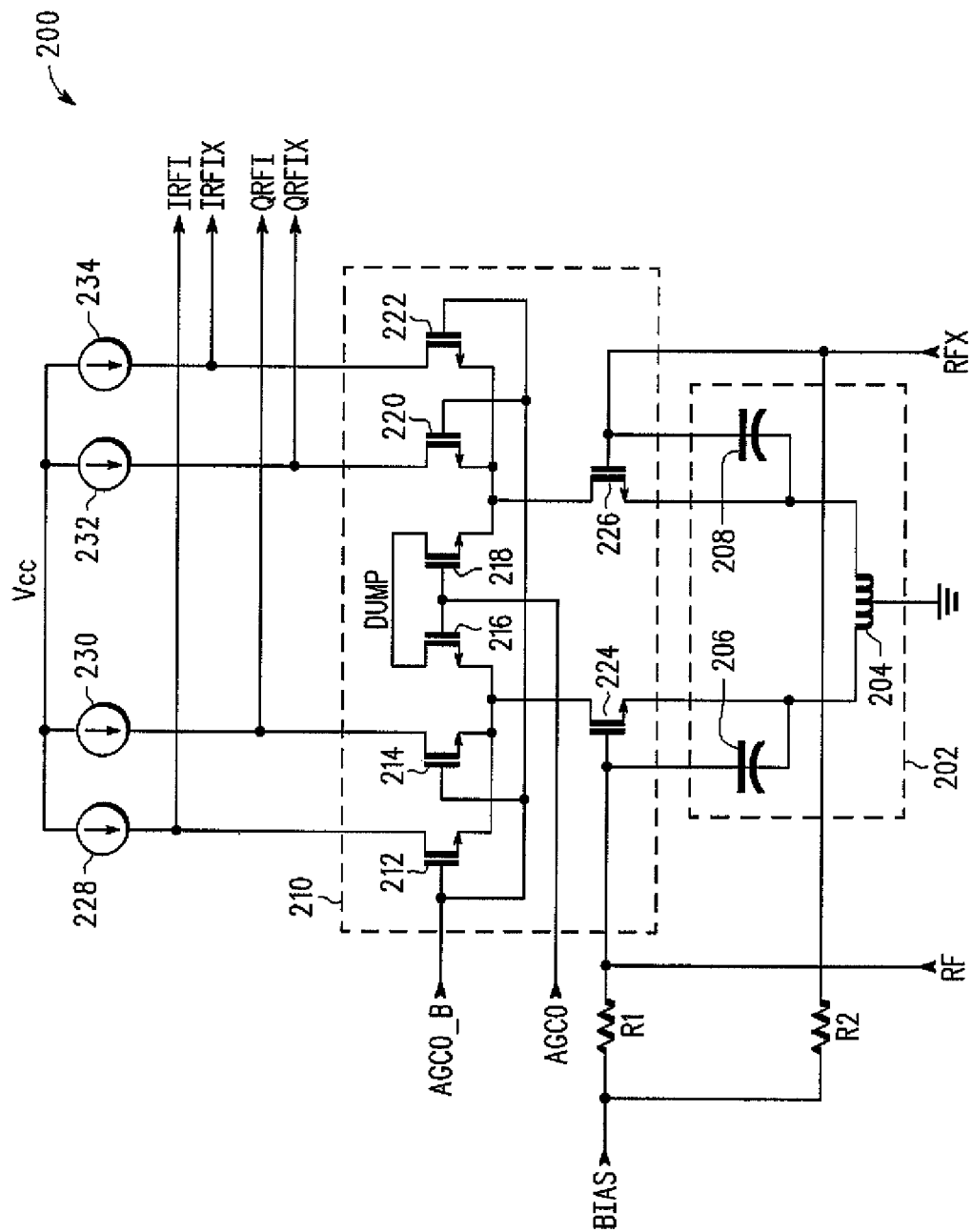
FIG. 2 is a diagram of an embodiment of an isolated transconductance amplifier with a single bit automatic gain control (AGC).

FIG. 2 is a diagram of an embodiment of an isolated transconductance amplifier 200. The amplifier 200 may be an embodiment of the isolated transconductance amplifier 108 in FIG. 1. The amplifier 200 may generate currents, which are a function of the voltage of the received RF signal. The received RF signal may be input to the amplifier 200 as differential signals RF and RFX. The received RF signal may have been filtered by the duplex filter 104 and passive gain match circuit 106 prior to input to the amplifier 200. If the received RF signal is single-ended, an input transconductance stage may convert the single-ended received RF signal to a differential RF signal for use within the amplifier 200 by AC grounding one of the differential inputs. An inductor 204 center tapped to ground and capacitors 206 and 208 may be included to optimize noise, input impedance, and linearity. The received RF signal is then amplified by a gain and converted from a voltage to currents in the amplifier 200. An active bias generator may generate a BIAS signal to minimize the up-conversion of low frequency noise with the presence of strong blockers.

The amplifier 200 may generate in-phase (I) differential currents IRFI and IRFIX and quadrature (Q) differential currents QRFI and QRFIX. The I currents IRFI and IRFIX and the Q currents QRFI and QRFIX are electrically isolated from one another. The I mixer 110 may receive the I currents IRFI and IRFIX, and the Q mixer 112 may receive the Q currents QRFI and QRFIX. The I currents IRFI and IRFIX are generated at a first node connected to the drains of NMOS transistors 212 and 222 and current sources 228 and 234. The Q currents QRFI and QRFIX are generated at a second node connected to the drains of NMOS transistors 214 and 220 and current sources 230 and 232. The drains and sources of the NMOS transistors may be current terminals of a transistor. Other transistors may be used, including, for example, PMOS transistors, bipolar junction transistors, or other types of transistors. Because the transistors 212 and 222 for the I currents and the transistors 214 and 220 for the Q currents are arranged in a cascode configuration with separate current source loads, the I and Q currents are electrically isolated from one another. The current sources 228 and 234 are active loads of the cascode configuration. The loads may be resistive, active, or reactive loads. The separate cascode stage provides isolation between the two mixers such that the IIP2 level of each mixer can be calibrated independently.

The amplifier 200 may include a binary weighted gain control section 210 controlled by signals AGC0 and AGC0_B. An optional step gain control section may also be included in the amplifier 200. The signals AGC0 and AGC0_B may be provided by a controller (not shown) to vary the gain as desired. The binary weighted gain control 210 may adjust the gain in binary intervals with the AGC0 and AGC0_B signals. In FIG. 2, the binary weighted gain control 210 may include NMOS transistors 212, 214, 216, 218, 220, 222, 224, and 226 arranged such that the AGC0 and AGC0_B signals may weight the gain of the RF and RFX signals. Binary weighted gain control may be achieved by switching current away from the load and into the DUMP node. Gain of the amplifier 200 may be controlled by an AGC (Automatic Gain Control) state machine. The differential RF signals RF and RFX may drive the gates of the transistors 224 and 226.

Figure 3:
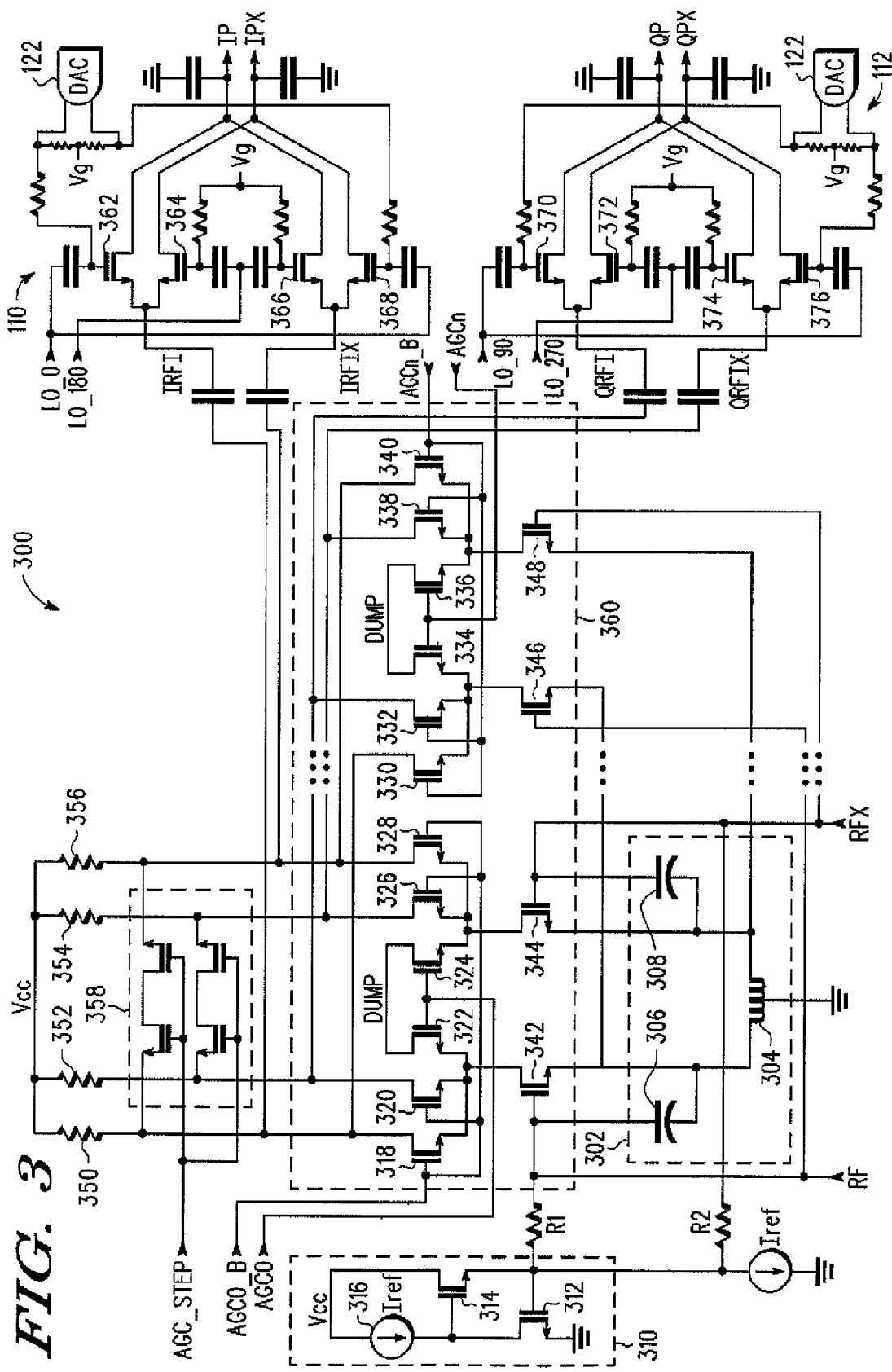
FIG. 3 is a diagram of a first alternative embodiment of an isolated transconductance amplifier with a resistive load, n-bit AGC, step AGC, and active bias circuit, in communication with a passive double balanced mixer.

FIG. 3 is a diagram of a first alternative embodiment of an isolated transconductance amplifier 300 in communication with passive double balanced mixers 110 and 112. The amplifier 300 may be an embodiment of the isolated transconductance amplifier 108 in FIG. 1. Currents may be generated by the amplifier 300 that are a function of the voltage of the received RF signal. The received RF signal may be input to the amplifier 300 as differential signals RF and RFX. If the received RF signal is single-ended, an input transconductance stage may convert the single-ended received RF signal to a differential RF signal for use within the amplifier 300. An inductor 304 center tapped to ground and capacitors 306 and 308 may be included to optimize noise, input impedance, and linearity. The received RF signal is then amplified by a gain and converted from a voltage to currents in the amplifier 300. An active bias generator 310, which minimizes the up-conversion of low frequency noise with the presence of strong blockers, may include NMOS transistors 312 and 314, a reference current source 316, and resistors R1 and R2. The NMOS transistor 314 may operate in the deep sub-threshold region.

The amplifier 300 may generate in-phase differential currents IRFI and IRFIX and quadrature differential currents QRFI and QRFIX. The I currents IRFI and IRFIX and the Q currents QRFI and QRFIX are electrically isolated from one another. The I mixer 110 may receive the I currents IRFI and IRFIX and the Q mixer 112 may receive the Q currents QRFI and QRFIX. The I currents IRFI and IRFIX are generated at a first node connected to the drains of NMOS transistors 318, 328, 330, and 340 and resistors 350 and 356. The Q currents QRFI and QRFIX are generated at a second node connected to the drains of NMOS transistors 320, 326, 332, and 338 and resistors 352 and 354. The drains and sources of the NMOS transistors may be current terminals of a transistor. Other transistors may be used, including, for example, PMOS transistors, bipolar junction transistors, or other types of transistors. Because the transistors 318, 328, 330, and 340 for the I currents and the transistors 320, 326, 332, and 338 for the Q currents are arranged in a cascode configuration with separate resistor loads, the I and Q currents are electrically isolated from one another. The loads may be resistive, active, or reactive loads.

The amplifier 300 may include a step gain control section 358 controlled by a signal AGC_STEP, and a binary weighted gain control section 360 controlled by signals AGCx and AGCx_B, where x is the bit width of the signals AGCx and AGCx_B. The signals AGC_STEP, AGCx, and AGCx_B may be provided by a controller (not shown) to vary the gain as desired. In particular, the step gain control may adjust the gain in discrete intervals with the AGC_STEP signal. Step gain may be achieved by reducing the load resistance through adding a smaller load in parallel with the main load, using the transistors in the step gain control section 358.

The binary weighted gain control 360 may further adjust the gain in binary intervals with the AGCx and AGCx_B signals. In particular, the possible binary intervals may depend on the bit width of the AGCx and AGCx_B signals. Each bit of the AGCx and AGCx_B signals may correspond to a stage In the binary weighted gain control 360. In FIG. 3, each stage may include NMOS transistors arranged such that the AGCx and AGCx_B signals may weight the gain of the RF and RFX signals. For example, the first stage of the binary weighted gain control 360 includes NMOS transistors 318, 320, 322, 324, 326, 328, 342, and 344. The nth stage of the binary weighted gain control 360 includes NMOS transistors 330, 332, 334, 336, 338, 340, 346, and 348. Binary weighted gain control may be achieved by switching current away from the load and into the DUMP node. Binary weighted gain control may be implemented with any number of control bits where: attenuation for each step is determined by the equation $20*\log(1-2^{\wedge}(n-2)/(2^{\wedge}n-1))$, where n is the number of control bits. The differential RF signals RF and RFX may drive the gates of the transistors 342, 344, 346, and 348.

The passive double balanced mixers 110 and 112 receive the I currents IRFI and IRFIX and Q currents QRFI and QRFIX, respectively. The I currents IRFI and IRFIX are mixed with I pulses LO_0 and LO_180 from the pulse generator 114 and an I IIP2 calibration signal from the IIP2 calibration circuit 122 to produce differential I signals IP and IPX. Similarly, the Q currents QRFI and QRFIX are mixed with Q pulses LO_90 and LO_270 from the pulse generator 114 and a Q IIP2 calibration signal from the IIP2 calibration circuit 122 to produce differential Q signals QP and QPX. The I and Q pulses from the pulse generator 116 may have a duty cycle of between 20% and 35%. The I mixer 110 may include NMOS transistors 362, 364, 366, and 368 to combine the I current with the I pulses and IIP2 calibration signal. The Q mixer 112 may include NMOS transistors 370, 372, 374, and 376 to combine the Q current with the Q pulses and Q IIP2 calibration signal. The sources of the transistors 362-368 may be coupled to the I currents IRFI and IRFIX, while the sources of the transistors 370-376 may be coupled to the Q currents QRFI and QRFIX. The LO_0 pulse may drive gates of the transistors 362 and 368 and the OUT_180 pulse may drive gates of the transistors 364 and 366. Similarly, the LO_90 pulse may drive gates of the transistors 370 and 376, while the LO_270 pulse may drive gates of the transistors 372 and 374. Capacitors may be included in the mixers 110 and 112 to attenuate noise and decouple AC variations in the signals. Other combinations of passive and/or active elements may be included in the mixers 110 and 112.

The function of the crossover correction circuit in the pulse generator 114 is clarified with reference to FIG. 3. The crossover correction circuit may adjust the amplitude crossover threshold to reduce the amount of time when the I and Q pulses are simultaneously active. The amplitude crossover threshold may include a crossing point of the I and Q pulses when one pulse is rising and the other is falling. For example, if the LO_0 pulse and the LO_90 pulse are both above a certain amplitude crossover threshold, the transistors 362, 368, 370, and 376 may be partially on. Preferably, the I mixer (transistors 362-368) and the Q mixer (transistors 370-376) are not turned on at the same time, so that current drain is reduced and receiver performance is not affected. The amplitude crossover threshold may be adjusted by the crossover correction circuit such that the I mixer and the Q mixer are not turned on at the same time.

Figure 4:
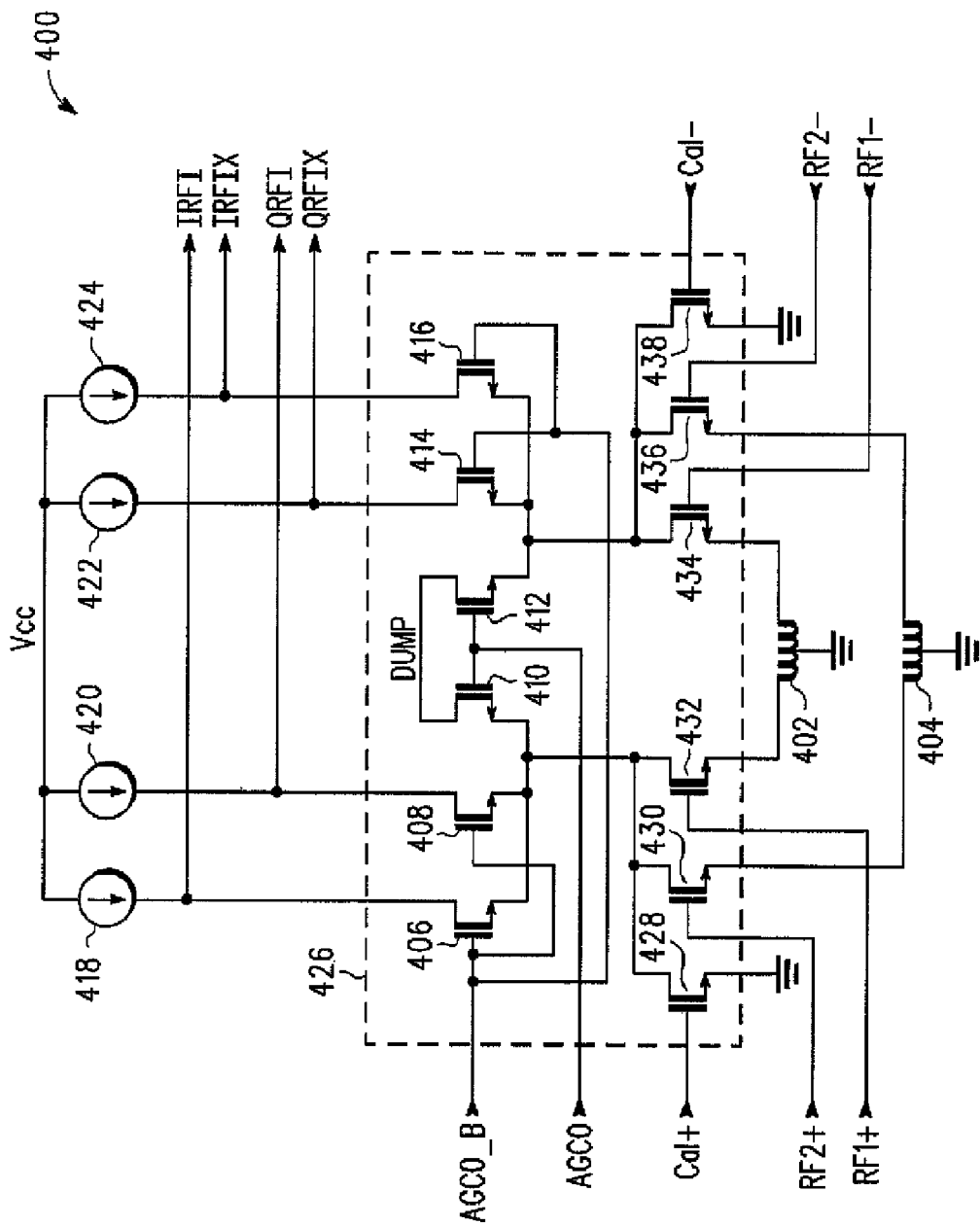
FIG. 4 is a diagram of a second alternative embodiment of an isolated transconductance amplifier for a multi-band receiver and with a calibration port.

The crossover correction circuit may generate a gate voltage bias Vg that is coupled to the gates of the transistors 362-376. The gate voltage bias Vg may adjust the gate voltage on each of the transistors to change the amplitude crossover threshold. The gate voltage bias Vg biases the crossover threshold of the I and Q pulses, and may compensate for temperature, process, or other variations. The gate voltage bias Vg may be adjusted so that it is less than the threshold voltage Vth added to the voltage Vcm, where Vcm is the common mode voltage at the input of the direct coupled filters 116 and 118. The crossover threshold of the I and Q pulses may be adjusted with other techniques, including level shifting the I and Q pulses with a voltage divider, sizing the transistors of the mixers 110 and 112, or other techniques FIG. 4 is a diagram of a second alternative embodiment of an isolated transconductance amplifier 400, The amplifier 400 may be an embodiment of the isolated transconductance amplifier 108 in FIG. 1. In-phase and quadrature currents may be generated by the amplifier 400 that are a function of the voltage of multiple received RF signals. The multiple received RF signals may represent multiple transmission bands and be input to the amplifier 400 as differential signals RF1+/RF1− and RF2+/RF2−. If the received RF signals are single-ended, an input transconductance stage may convert the single-ended received RF signals to differential RF signals for use within the amplifier 400. The inductors 402 and 404 are center tapped to ground to optimize noise, input impedance, and linearity. The received RF signals are then amplified by a gain and converted from a voltage to currents in the amplifier 400. The amplifier 400 may be included a multi-band receiver that can support more than one band, e.g., a 2100 MHz band and a 1900 MHz band. The received RF signals are ORed at the output of the input stage and the cascode structure of the amplifier 400 is shared by all bands to save die area.

The amplifier 400 may generate in-phase differential currents IRFI and IRFIX and quadrature differential currents QRFI and QRFIX. The I currents IRFI and IRFIX and the Q currents QRFI and QRFIX are electrically isolated from one another. The I mixer 110 may receive the I currents IRFI and IRFIX, and the Q mixer 112 may receive the Q currents QRFI and QRFIX. The I currents IRFI and IRFIX are generated at a first node connected to the drains of NMOS transistors 406 and 416 and current sources 418 and 424. The Q currents QRFI and QRFIX are generated at a second node connected to the drains of NMOS transistors 408 and 414 and current sources 420 and 422. The drains and sources of the NMOS transistors may be current terminals of a transistor. Because the transistors 406 and 416 for the I currents and the transistors 408 and 414 for the Q currents are arranged in a cascode configuration with separate current source loads, the I and Q currents are electrically isolated from one another. The current sources 420 and 422 are active loads of the cascode configuration. The loads may be resistive, active, or reactive loads.

The amplifier 400 may Include a binary weighted gain control section 426 controlled by signals AGC0 and AGC0_B that may be provided by a controller (not shown) to vary the gain as desired. The binary weighted gain control 426 may adjust the gain in binary intervals with the AGC0 and AGC0_B signals. In FIG. 4, the binary weighted gain control 426 may include NMOS transistors 406, 408, 410, 412, 414, 416, 428, 430, 432, 434, 436, and 438 arranged such that the AGC0 and AGC0_B signals may weight the gain of the RF1 and RF2 signals. Binary weighted gain control may be achieved by switching current away from the load and into the DUMP node.

A calibration tone Cal+/Cal− may also be input to the amplifier 400 to calibrate the IIP2 level of the receiver 100 during receiver warm-up. During the receiver warm-up, the calibration tone is injected into the receiver at Cal+ and Cal− ports to generate IMD2. The IMD2 level is measured by a digital signal processor for each of the I and Q channels. The IIP2 calibration circuit 122 may try to minimize the IMD2 level by varying the digital code applied to DACs in the circuit 122. The DACs convert a digital code into an analog DC voltage to adjust the DC bias for the I mixer and Q mixer to optimize the IIP2 of the mixers.

Figure 5:
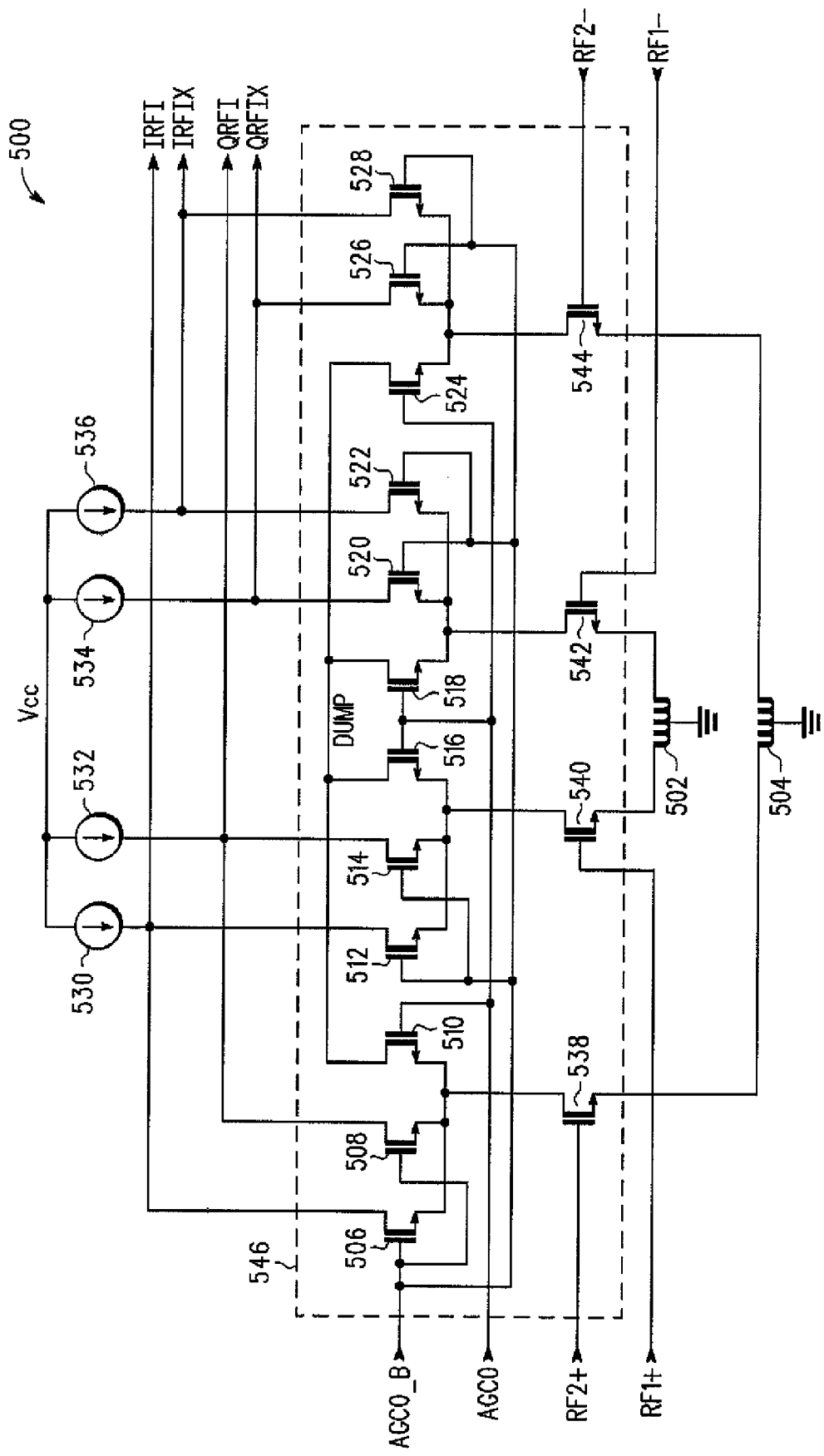
FIG. 5 is a diagram of a third alternative embodiment of an isolated transconductance amplifier for a multi-band receiver without a shared cascade stage between bands.

FIG. 5 is a diagram of a third alternative embodiment of an isolated transconductance amplifier 500. The amplifier 500 may be an embodiment of the isolated transconductance amplifier 108 in FIG. 1. In this embodiment, the cascode transistors for the multiple bands are not shared and the bands are ORed at the output of the cascode structure. In-phase and quadrature currents may be generated by the amplifier 500 that are a function of the voltage of multiple received RF signals. The multiple received RF signals may represent multiple transmission bands and be input to the amplifier 500 as differential signals RF1+/RF1− and RF2+/RF2−. If the received RF signals are single-ended, an input transconductance stage may convert the single-ended received RF signals to differential RF signals for use within the amplifier 500. The inductors 502 and 504 are center tapped to ground to optimize noise, input impedance, and linearity. The received RF signals are then amplified by a gain and converted from a voltage to currents in the amplifier 500.

The amplifier 500 may generate in-phase differential currents IRFI and IRFIX and quadrature differential currents QRFI and QRFIX. The I mixer 110 may receive the I currents IRFI and IRFIX and the Q mixer 112 may receive the Q currents QRFI and QRFIX. The I currents IRFI and IRFIX are generated at a first node connected to the drains of NMOS transistors 506, 512, 522, and 528 and current sources 530 and 536. The Q currents QRFI and QRFIX are generated at a second node connected to the drains of NMOS transistors 508, 514, 520, and 526 and current sources 532 and 534. The drains and sources of the NMOS transistors may be current terminals of a transistor. Other types of transistors may be used, including, for example, PMOS transistors, bipolar junction transistors, or other types of transistors. Because the transistors 506, 512, 522, and 528 for the I currents and the transistors 508, 514, 520, and 526 for the Q currents are arranged in a cascode configuration with separate current source loads, the I and Q currents are electrically isolated from one another. The current sources 420 and 422 are active loads of the cascode configuration. The loads may be resistive, active, or reactive loads. The isolation between the multiple bands is improved in the topology of amplifier 500 compared to the amplifier 400 because the drains of the NMOS transistors 538 and 540, as well as NMOS transistors 542 and 544, are not tied together.

The amplifier 500 may include a binary weighted gain control section 546 controlled by signals AGC0 and AGC0_B that may be provided by a controller (not shown) to vary the gain as desired. The binary weighted gain control 546 may adjust the gain in binary intervals with the AGC0 and AGC0_B signals. In FIG. 5, the binary weighted gain control 546 may include NMOS transistors 506-528 and 538, 540, 542, and 544 arranged such that the AGC0 and AGC0_B signals may weight the gain of the RF1 and RF2 signals. Binary weighted gain control may be achieved by switching current away from the load and into the DUMP node.

Figure 6:
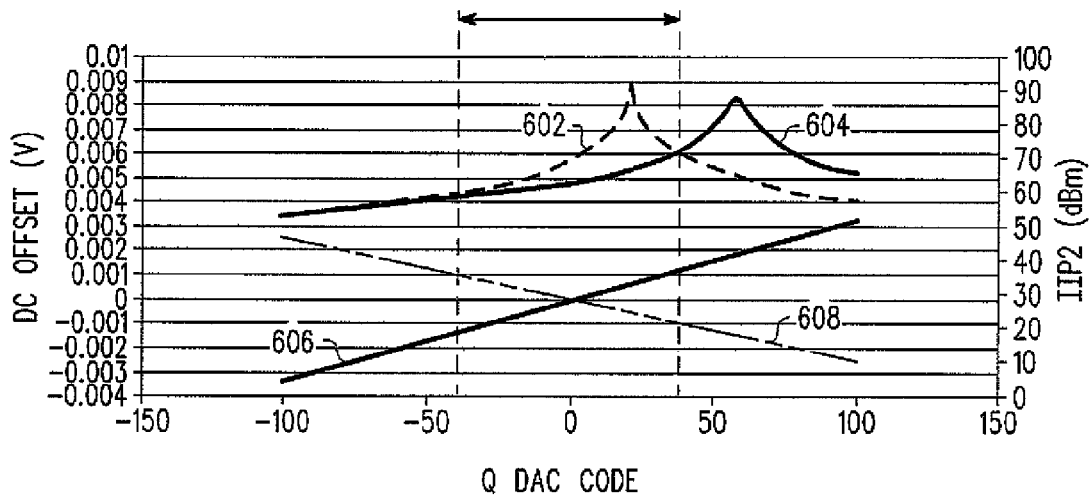
FIG. 6 is a plot of exemplary second order input intercept point (IIP2) and DC offset versus IIP2 calibration digital-to-analog converter (DAC) codes for in-phase and quadrature channels of a radio frequency receiver where the I and Q signals to the mixers are generated at a common node.

FIG. 6 is a plot of exemplary second order input intercept point (IIP2) and DC offset versus IIP2 calibration digital-to-analog converter (DAC) codes for in-phase and quadrature channels of a radio frequency receiver where the I and Q signals to the mixers are generated at a common node. The plot in FIG. 6 shows the changes in I and Q DC offset and I and Q IIP2 levels as the Q DAC code is varied. The Q DAC code produces a Q IIP2 calibration signal that may bias transistor gates in the Q mixer 112 to adjust the IIP2 level 604 of the Q channel, as described previously. The Q DAC code may be changed when calibrating the Q IIP2 level. As the Q DAC code is varied in this type of receiver, not only does the Q IIP2 level 604 change, but the I IIP2 level 602 changes as well. In addition, both the I DC offset 606 and Q DC offset 608 change with variation of the Q DAC code. Changing the Q DAC code to calibrate the Q IIP2 level may cause the I IIP2 level to be adversely affected. Therefore, using a receiver where the I and Q currents are generated at a common node may reduce the overall performance of the receiver because the optimal overall IIP2 level may not be achievable.

Figure 7:
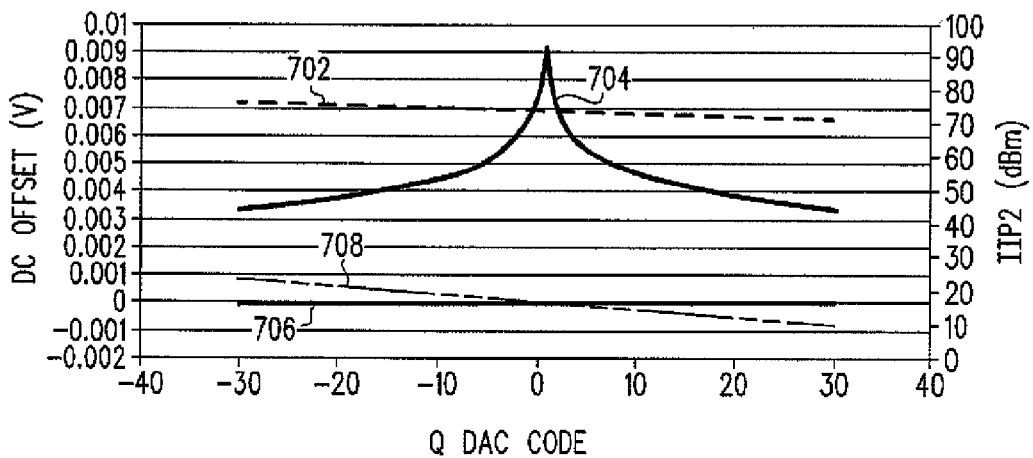
FIG. 7 is a plot of exemplary IIP2 and DC offset versus IIP2 calibration DAC codes for in-phase and quadrature channels of an embodiment of a radio frequency receiver where the I and Q currents to the mixers are electrically isolated.

FIG. 7 is a plot of exemplary IIP2 and DC offset versus IIP2 calibration DAC codes for in-phase and quadrature channels of an embodiment of a radio frequency receiver where the I and Q currents to the mixers are electrically isolated. The plot in FIG. 7 shows the changes in I and Q DC offset and I and Q IIP2 levels as the Q DAC code is varied. In FIG. 7, as the Q DAC code is changed to calibrate the optimal Q IIP2 level 704, the I IIP2 level 702 is substantially constant. The I DC offset 706 is also substantially constant as the Q DAC level is changed. In contrast to the plot shown in FIG. 6, changing the Q DAC code to calibrate the Q IIP2 level does not adversely affect the I IIP2 level. Therefore, using a receiver where the I and Q currents are electrically isolated allows optimal calibration of the overall IIP2 level for the receiver. Independent optimization of the I and Q IIP2 levels allow the IIP2 calibration circuit to use a faster algorithm, such as gradient or binary search, which may reduce the time needed for calibration. Although it is possible to use a binary search algorithm for receivers without a split channel, the interaction between the I and Q channels may result in suboptimal IIP2 performance. The total required tuning range is also minimized, which avoids calibration range problems. The DC offset 706 for the I channel does not change as the Q DAC code is swept and the total DC offset is minimized.

Figure 8:
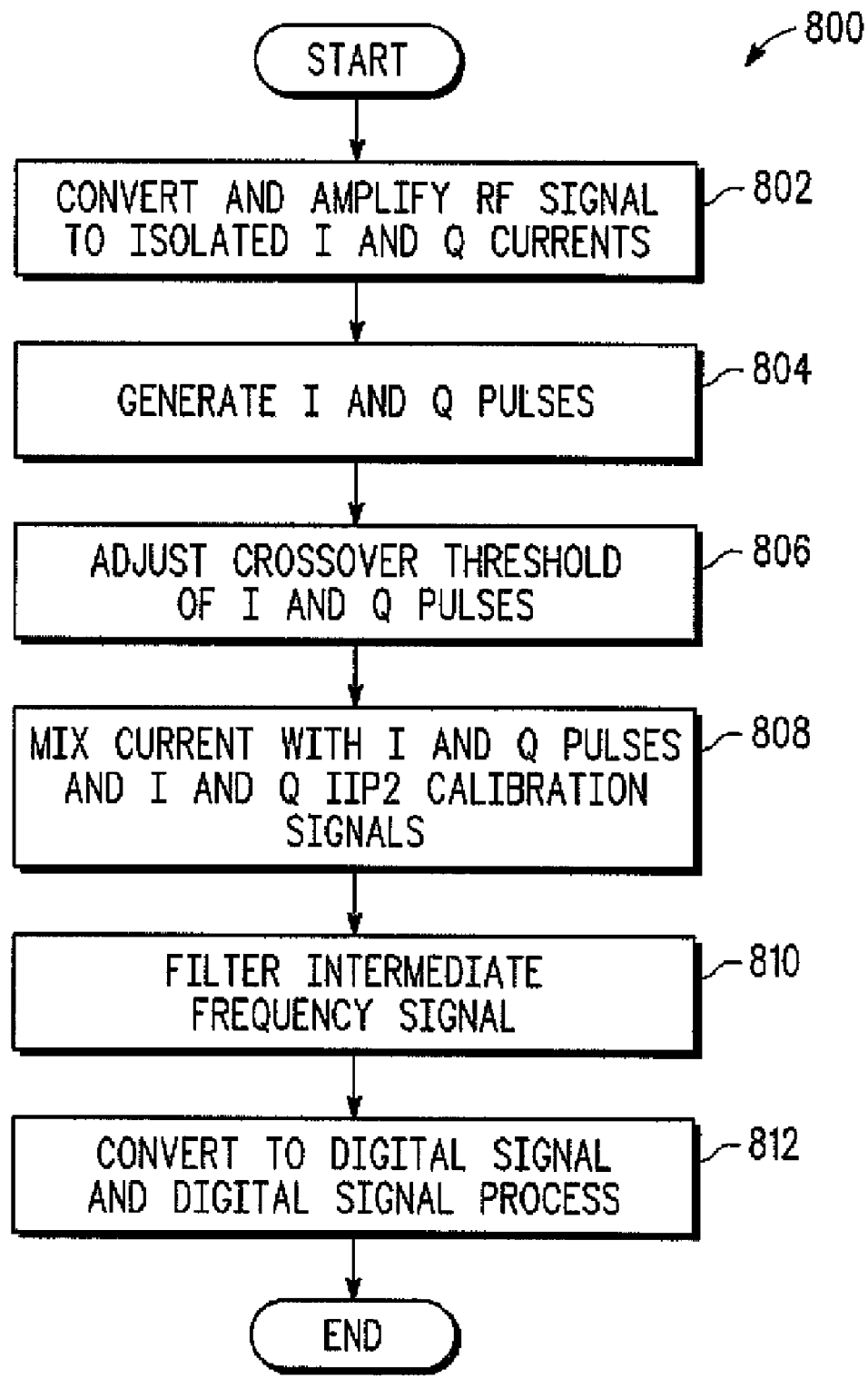
FIG. 8 is a flowchart of an embodiment of a method for receiving a radio frequency signal.

FIG. 8 is a flowchart of an embodiment of a method 800 for receiving a radio frequency signal. The method may be implemented using the radio frequency receiver 100 and the embodiments of the components described above, or with alternative receiver configurations. Additional, different, or fewer steps may be provided than shown in FIG. 8.

At Step 802, a voltage of a received radio frequency signal may be converted to a currents and amplified. The RF signal may be converted by an isolated transconductance amplifier that converts a voltage to multiple electrically isolated currents. The amplifier may include step control or binary weighting control to adjust the amplification. At Step 804, in-phase (I) and quadrature (Q) pulses may be generated based on a periodic signal. The I and Q pulses may have a duty cycle of less than 35%. The I and Q pulses may be zero, ninety, one hundred eighty, and two hundred seventy degrees out of phase from the periodic signal. The pulses may be generated with latches, and/or other combinatorial or sequential components, or other circuits. A crossover threshold of the pulses may be adjusted at Step 806, such that an overlap between a rising and a falling pulse is substantially reduced. The crossover threshold may be adjusted so that the amount of time switches in a mixer controlled by the pulses are turned on is reduced.

At Step 808, the currents generated at Step 802 may be mixed with the pulses generated at Steps 804 and 806 and with I and Q IIP2 calibration signals to produce an intermediate frequency signal, which may be a zero intermediate frequency baseband signal. The intermediate frequency signal may include an in-phase signal and a quadrature signal, and may be currents. The mixing at Step 808 may be performed by a mixer comprising NMOS transistors, for example, to combine the RF signal with I and Q pulses and I and Q IIP2 calibration signals. At Step 810, the intermediate frequency signal may be filtered to a filtered voltage signal. A complex direct coupled filter may perform the filtering at Step 810. The resulting filtered voltage signal may be converted to a digital signal and digitally signal processed to retrieve information in the RF signal at Step 812. Additional filtering, matching, and other steps may be included in the method 800 to process the received RF signal to attain desired performance characteristics.

A radio frequency receiver has been disclosed comprising a transconductance amplifier operable to amplify and convert a first received voltage of a first radio frequency signal to first and second currents that are electrically isolated; a pulse generator operable to generate in-phase and quadrature pulses; a mixer operable to combine the first current with the in-phase pulses to produce a third current comprising an in-phase signal, and combine the second current with the quadrature pulses to produce a fourth current comprising a quadrature signal; and a filter operable to filter the third and fourth currents to filtered voltage signals. The in-phase and quadrature pulses may have a duty cycle of 35% or less. The rise time and fall time of the in-phase and quadrature pulses may also be adjusted to reduce the amount of time the in-phase and quadrature pulses are simultaneously active. The mixer may comprise a passive double balanced mixer and the filter may comprise a direct coupled complex filter. The radio frequency receiver may further comprise a first digital-to-analog converter operable to convert a first digital control signal to an in-phase second order input intercept point (IIP2) calibration signal configured to adjust an in-phase IIP2 level; and a second digital-to-analog converter operable to convert a second digital control signal to a quadrature IIP2 calibration signal configured to adjust a quadrature IIP2 level; where the mixer is further operable to combine the first current with the in-phase pulses and the in-phase IIP2 calibration signal to produce the third current, and combine the second current with the quadrature pulses and the quadrature IIP2 calibration signal to produce the fourth current. The adjustment of the in-phase IIP2 level may not affect the quadrature IIP2 level, and adjustment of the quadrature IIP2 level may not affect the in-phase IIP2 level.

The radio frequency receiver may further comprise a crossover correction circuit operable to control a crossover threshold of the in-phase and quadrature pulses and where the crossover threshold comprises a crossing point of an amplitude of the in-phase and quadrature pulses, where the crossing point selected to reduce the amount of time the in-phase and quadrature pulses are simultaneously active. The double balanced mixer may comprise transistors and the crossover correction circuit may be operable to bias a control terminal voltage of the transistors to select the crossing point. The transconductance amplifier may be further operable to amplify and convert the first received voltage of the radio frequency signal to the amplified current using one or more of step weighting or binary weighting. The radio frequency receiver may further comprise a third digital-to-analog converter operable to convert a digital control signal to a DC offset correction signal, where the DC offset correction signal is operable to adjust a DC offset of the filtered voltage signals.

The amplifier may comprise a first transistor with a control terminal in communication with the first received voltage and a current terminal in communication with a first node; a second transistor operable to generate the first current, and with a first current terminal in communication with the first node and a second current terminal in communication with a first load; a third transistor operable to generate the second current, and with a first current terminal in communication with the first node and a second current terminal in communication with a second load. The first current is generated at the second current terminal of the second transistor, and the second current is generated at the second current terminal of the third transistor.

The amplifier may further be operable to amplify and convert a second received voltage of a second radio frequency signal to the first and second currents. The amplifier may further comprise a fourth transistor with a control terminal in communication with a second received voltage and a current terminal in communication with the first node. Alternately, the amplifier may further comprise a fifth transistor with a control terminal in communication with the second received voltage and a current terminal in communication with a second node; a sixth transistor operable to generate the first current, and with a first current terminal in communication with the second node and a second current terminal in communication with the first load; and a seventh transistor operable to generate the second current, and with a first current terminal in communication with the second node and a second current terminal in communication with the second load. The first current is generated at the second current terminal of the second transistor and the second current terminal of the sixth transistor, and the second current is generated at the second current terminal of the third transistor and the second current terminal of the seventh transistor. The amplifier may be further operable to receive a calibration tone, where the calibration tone is usable to measure an IIP2 level of the receiver.

A method of receiving a first radio frequency signal has been disclosed comprising converting and amplifying a first voltage of the first radio frequency signal to an amplified current, where the amplified current comprising a first current and a second current that are electrically isolated; generating in-phase pulses and quadrature pulses; mixing the first current with the in-phase pulses to produce an in-phase signal; mixing the second current with the quadrature pulses to produce a quadrature signal. The in-phase and quadrature pulses may have a duty cycle of 35% or less. The method may further comprise adjusting a rise time and a fall time of the in-phase and quadrature pulses to reduce the amount of time the in-phase and quadrature pulses are simultaneously active.

The method may further comprise converting a first digital control signal to an in-phase second order input intercept point (IIP2) calibration signal configured to adjust an in-phase IIP2 level; converting a second digital control signal to a quadrature IIP2 calibration signal configured to adjust a quadrature IIP2 level; mixing the first current with the in-phase pulses and the in-phase IIP2 calibration signal to produce the in-phase signal; and mixing the second current with the quadrature pulses and the quadrature IIP2 calibration signal to produce the quadrature signal. Adjusting the in-phase IIP2 level may not affect the quadrature IIP2 level, and adjusting the quadrature IIP2 level may not affect the in-phase IIP2 level. The method may also comprise selecting a crossing point of the in-phase pulses and the quadrature pulses to reduce the amount of time the in-phase pulses and quadrature pulses are simultaneously active. The method may comprise step weighting and binary weighting the amplification of the voltage of the radio frequency signal to the amplified current. The method may further comprise amplifying and converting a second voltage of a second radio frequency signal to the amplified current.

A radio frequency receiver has been disclosed, comprising a transconductance amplifier operable to amplify and convert a received voltage of a radio frequency signal to an amplified current, the amplified current comprising a first current and a second current that are electrically isolated, the amplifier configured to step weight and binary weight the amplification; a pulse generator operable to generate in-phase and quadrature pulses based on a periodic signal, the in-phase and quadrature pulses having an approximately 25% duty cycle and comprising a first pulse zero degrees out of phase from the periodic signal, a second pulse one hundred eighty degrees out of phase from the periodic signal, a third pulse ninety degrees out of phase from the periodic signal, and a fourth pulse two hundred seventy degrees out of phase from the periodic signal; a crossover correction circuit operable to control an amplitude crossover threshold of the in-phase and quadrature pulses, such that the in-phase and quadrature pulses are not active simultaneously; and a mixer operable to combine the first current with the in-phase pulses to produce a third current comprising an in-phase signal; and combine the second current with the quadrature pulses to produce a fourth current comprising a quadrature signal.

Although the invention is described herein with reference to specific embodiments, various modifications and changes can be made without departing from the scope of the present invention as set forth in the claims below. For example, different embodiments of the isolated transconductance amplifier have been described above. Other embodiments are possible for providing isolation of the I and Q signals. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

As used herein, the phrases "coupled with," "coupled between," or like phrases, are defined to mean directly connected to or indirectly connected through one or more intermediate components. Unless stated otherwise, terms such as "first" and "second" are used to arbitrarily distinguish between the elements such terms describe. Thus, these terms are not necessarily intended to indicate temporal or other prioritization of such elements.

What is claimed is:

1. A radio frequency receiver, comprising:
   a transconductance amplifier operable to amplify and convert a first received voltage of a first radio frequency signal to first and second currents that are electrically isolated;
   a pulse generator operable to generate in-phase and quadrature pulses;
   a mixer operable to combine the first current with the in-phase pulses to produce a third current comprising an in-phase signal; and combine the second current with the quadrature pulses to produce a fourth current comprising a quadrature signal; and
   a filter operable to filter the third and fourth currents to filtered voltage signals;
   where the transconductance amplifier comprises separate cascode stages isolating the first and second currents.

2. The radio frequency receiver of claim 1, where the in-phase and quadrature pulses have a duty cycle of 35% or less.

3. The radio frequency receiver of claim 1, where a rise time and a fall time of the in-phase and quadrature pulses are adjusted to reduce the amount of time the in-phase and quadrature pulses are simultaneously active.

4. The radio frequency receiver of claim 1 where the mixer comprises a passive double balanced mixer and the filter comprises a direct coupled complex filter.

5. The radio frequency receiver of claim 1 where the transconductance amplifier is further operable to amplify and convert the first received voltage of the radio frequency signal to the amplified current using one or more of step weighting or binary weighting.

6. The radio frequency receiver of claim 1, further comprising a third digital-to-analog converter operable to convert a digital control signal to a DC offset correction signal, the DC offset correction signal operable to adjust a DC offset of the filtered voltage signals.

7. The radio frequency receiver of claim 1 where the amplifier is further operable to receive a calibration tone, the calibration tone usable to measure an IIP2 level of the receiver.

8. A radio frequency receiver, comprising:
   a transconductance amplifier operable to amplify and convert a first received voltage of a first radio frequency signal to first and second currents that are electrically isolated;
   a pulse generator operable to generate in-phase and quadrature pulses;
   a mixer operable to combine the first current with the in-phase pulses to produce a third current comprising an in-phase signal; and combine the second current with the quadrature pulses to produce a fourth current comprising a quadrature signal;
   a filter operable to filter the third and fourth currents to filtered voltage signals;
   a first digital-to-analog converter operable to convert a first digital control signal to an in-phase second order input intercept point (IIP2) calibration signal configured to adjust an in-phase IIP2 level; and
   a second digital-to-analog converter operable to convert a second digital control signal to a quadrature IIP2 calibration signal configured to adjust a quadrature IIP2 level; and
   where adjustment of the in-phase IIP2 level does not affect the quadrature IIP2 level, adjustment of the quadrature IIP2 level does not affect the in-phase IIP2 level, and the mixer is further operable to combine the first current with the in-phase pulses and the in-phase IIP2 calibration signal to produce the third current and combine the second current with the quadrature pulses and the quadrature IIP2 calibration signal to produce the fourth current.

9. The radio frequency receiver of claim 8, where the transconductance amplifier comprises separate cascode stages isolating the first and second currents.

10. A radio frequency receiver, comprising:
    a transconductance amplifier operable to amplify and convert a first received voltage of a first radio frequency signal to first and second currents that are electrically isolated;
    a pulse generator operable to generate in-phase and quadrature pulses;
    a mixer operable to combine the first current with the in-phase pulses to produce a third current comprising an in-phase signal; and combine the second current with the quadrature pulses to produce a fourth current comprising a quadrature signal;
    a filter operable to filter the third and fourth currents to filtered voltage signals; and
    a crossover correction circuit operable to control a crossover threshold of the in-phase and quadrature pulses and where the crossover threshold comprises a crossing point of an amplitude of the in-phase and quadrature pulses, the crossing point selected to reduce the amount of time the in-phase and quadrature pulses are simultaneously active, and where the double balanced mixer comprises transistors and the crossover correction circuit is operable to bias a control terminal voltage of the transistors to select the crossing point.

11. A radio frequency receiver, comprising:
a transconductance amplifier operable to amplify and convert a first received voltage of a first radio frequency signal to first and second currents that are electrically isolated;
a pulse generator operable to generate in-phase and quadrature pulses;
a mixer operable to combine the first current with the in-phase pulses to produce a third current comprising an in-phase signal; and combine the second current with the quadrature pulses to produce a fourth current comprising a quadrature signal; and
a filter operable to filter the third and fourth currents to filtered voltage signals;
where the amplifier comprises:
a first transistor with a control terminal in communication with the first received voltage and a current terminal in communication with a first node;
a second transistor operable to generate the first current, and with a first current terminal in communication with the first node and a second current terminal in communication with a first load; and
a third transistor operable to generate the second current, and with a first current terminal in communication with the first node and a second current terminal in communication with a second load.

12. The radio frequency receiver of claim 11, where the first current is generated at the second current terminal of the second transistor, and the second current is generated at the second current terminal of the third transistor.

13. The radio frequency receiver of claim 11, where the amplifier is further operable to amplify and convert a second received voltage of a second radio frequency signal to the first and second currents, and where the amplifier further comprises a fourth transistor with a control terminal in communication with a second received voltage and a current terminal in communication with the first node.

14. The radio frequency receiver of claim 11, where the amplifier is further operable to amplify and convert a second received voltage of a second radio frequency signal to the first and second currents, and where the amplifier further comprises:
a fifth transistor with a control terminal in communication with the second received voltage and a current terminal in communication with a second node;
a sixth transistor operable to generate the first current, and with a first current terminal in communication with the second node and a second current terminal in communication with the first load; and
a seventh transistor operable to generate the second current, and with a first current terminal in communication with the second node and a second current terminal in communication with the second load.

15. The radio frequency receiver of claim 14, where the first current is generated at the second current terminal of the second transistor and the second current terminal of the sixth transistor, and the second current is generated at the second current terminal of the third transistor and the second current terminal of the seventh transistor.

16. A method of receiving a first radio frequency signal, comprising:
converting and amplifying a first voltage of the first radio frequency signal to an amplified current, the amplified current comprising a first current and a second current that are electrically isolated;
generating in-phase pulses and quadrature pulses;
mixing the first current with the in-phase pulses to produce an in-phase signal;
mixing the second current with the quadrature pulses to produce a quadrature signal;
where converting and amplifying the first voltage comprises splitting a current before separate cascode stages of a transconductance amplifier.

17. The method of claim 16, where the in-phase and quadrature pulses have a duty cycle of 35% or less.

18. The method of claim 16, further comprising adjusting a rise time and a fall time of the in-phase and quadrature pulses to reduce the amount of time the in-phase and quadrature pulses are simultaneously active.

19. The method of claim 16, further comprising selecting a crossing point of the in-phase pulses and the quadrature pulses to reduce the amount of time the in-phase pulses and quadrature pulses are simultaneously active.

20. The method of claim 16, further comprising step weighting and binary weighting the amplification of the voltage of the radio frequency signal to the amplified current.

21. A method of receiving a first radio frequency signal, comprising:
converting and amplifying a first voltage of the first radio frequency signal to an amplified current, the amplified current comprising a first current and a second current that are electrically isolated;
generating in-phase pulses and quadrature pulses;
mixing the first current with the in-phase pulses to produce an in-phase signal;
mixing the second current with the quadrature pulses to produce a quadrature signal;
converting a first digital control signal to an in-phase second order input intercept point (IIP2) calibration signal configured to adjust an in-phase IIP2 level;
converting a second digital control signal to a quadrature IIP2 calibration signal configured to adjust a quadrature IIP2 level;
mixing the first current with the in-phase pulses and the in-phase IIP2 calibration signal to produce the in-phase signal; and
mixing the second current with the quadrature pulses and the quadrature IIP2 calibration signal to produce the quadrature signal.

22. The method of claim 21, where adjusting the in-phase IIP2 level does not affect the quadrature IIP2 level, and adjusting the quadrature IIP2 level does not affect the in-phase IIP2 level.

23. The method of claim 21, where converting and amplifying the first voltage comprises splitting a current before separate cascode stages of a transconductance amplifier.

24. A radio frequency receiver, comprising:
a transconductance amplifier operable to amplify and convert a received voltage of a radio frequency signal to an amplified current, the amplified current comprising a first current and a second current that are electrically isolated, the amplifier configured to step weight and binary weight the amplification;
a pulse generator operable to generate in-phase and quadrature pulses based on a periodic signal, the in-phase and quadrature pulses having a duty cycle of 35% of less and comprising a first pulse zero degrees out of phase from the periodic signal, a second pulse one hundred eighty degrees out of phase from the periodic signal, a third pulse ninety degrees out of phase from the periodic signal, and a fourth pulse two hundred seventy degrees out of phase from the periodic signal;

a crossover correction circuit operable to control an amplitude crossover threshold of the in-phase and quadrature pulses, such that the in-phase and quadrature pulses are not active simultaneously; and a mixer operable to combine the first current with the in-phase pulses to produce a third current comprising an in-phase signal; and combine the second current with the quadrature pulses to produce a fourth current comprising a quadrature signal.

* * * * *